United States Patent
Lavi et al.

(10) Patent No.: US 10,257,304 B2
(45) Date of Patent: Apr. 9, 2019

(54) SYSTEM AND METHOD FOR MOBILE PLATFORM CACHE USING MOBILE DEVICES

(71) Applicant: GM GLOBAL TECHNOLOGY OPERATIONS LLC, Detroit, MI (US)

(72) Inventors: Nadav Lavi, Ramat-Hasharon (IL); Moshe Laifenfeld, Haifa (IL); Tal Philosof, Givatayim (IL)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 246 days.

(21) Appl. No.: 15/170,171

(22) Filed: Jun. 1, 2016

(65) Prior Publication Data

US 2017/0353574 A1 Dec. 7, 2017

(51) Int. Cl.
| | |
|---|---|
| *H04W 4/80* | (2018.01) |
| *H04W 8/22* | (2009.01) |
| *H04W 8/24* | (2009.01) |
| *G06F 11/30* | (2006.01) |
| *H04L 29/08* | (2006.01) |
| *H04W 84/12* | (2009.01) |

(52) U.S. Cl.
CPC ........ *H04L 67/2842* (2013.01); *H04L 67/303* (2013.01); *H04W 4/80* (2018.02); *G06F 11/3055* (2013.01); *H04L 67/04* (2013.01); *H04W 8/22* (2013.01); *H04W 8/24* (2013.01); *H04W 84/12* (2013.01)

(58) Field of Classification Search
CPC ... H04L 67/2842; H04L 67/303; H04L 67/04; H04W 4/80; H04W 8/22; H04W 8/24; H04W 8/245; G06F 11/3055; G06F 11/3065
USPC ........................................................ 709/212
See application file for complete search history.

(56) References Cited

U.S. PATENT DOCUMENTS

| | | | | |
|---|---|---|---|---|
| 9,521,523 | B1* | 12/2016 | Bostick | H04W 4/029 |
| 2003/0236818 | A1* | 12/2003 | Bruner | G01C 21/34 |
| | | | | 709/200 |
| 2006/0240808 | A1* | 10/2006 | Crolley | G06Q 30/02 |
| | | | | 455/414.1 |
| 2007/0078899 | A1* | 4/2007 | Gulin | H04M 1/72525 |
| 2012/0129503 | A1* | 5/2012 | Lindeman | H04L 67/34 |
| | | | | 455/414.1 |
| 2016/0210131 | A1* | 7/2016 | Vangelov | G06F 8/65 |
| 2017/0357499 | A1* | 12/2017 | Hong | G06F 8/65 |

* cited by examiner

*Primary Examiner* — Patrice L Winder
*Assistant Examiner* — Lam H Duong
(74) *Attorney, Agent, or Firm* — Lorenz & Kopf LLP

(57) ABSTRACT

A system and method that enables large content data transfers to mobile platforms is provided. The mobile platform cache system and method provided build a cache suitable for large content data transfers using the available storage capacity of one or more frequently used, existing mobile devices. The provided mobile cache system and method prioritize available free or low cost communication protocols for data transfer to one or more mobile devices, enabling the use of free Wi-Fi communications or low cost communications, and minimizing the use of cellular data transmissions for large content data transfers.

14 Claims, 2 Drawing Sheets

SYSTEM AND METHOD FOR MOBILE PLATFORM CACHE USING MOBILE DEVICES

TECHNICAL FIELD

The technical field generally relates to a system and related operating methods for a mobile platform cache using mobile devices.

BACKGROUND

Mobile platforms, such as vehicles, often send and receive data via cellular data transmission systems. The data to be transmitted and received, such as updates to software and firmware, continues to grow in size. In addition, the demand for other large content data transfers, such as movies and entertainment applications, is increasing. The connectivity cost associated with these large content data transfers via cellular data transmission can be quite high. In addition, limitations in cellular data bandwidth may adversely affect, or prohibit, large content data transfers.

Accordingly, systems and methods that enable large content data transfers to mobile platforms at a lower cost are desirable. Specifically, building a cache suitable for large content data transfers using the available storage capacity of one or more frequently used, existing mobile devices can save costs. It would further be desirable for the mobile platform cache system and method to not exclusively depend on cellular data transmissions, and enable free or low cost data transmission where available. Furthermore, other desirable features and characteristics of the present invention will be apparent from the subsequent detailed description and the appended claims, taken in conjunction with the accompanying drawings and the foregoing technical field and background.

SUMMARY

This summary is provided to introduce a selection of concepts in a simplified form that are further described below in the detailed description section. This summary is not intended to identify key features or essential features of the claimed subject matter, nor is it intended to be used as an aid in determining the scope of the claimed subject matter.

A mobile platform cache method is provided. The method comprises: (a) receiving, by a server cache module, via communication from a mobile device cache module, storage capacity information associated with a mobile device; (b) building, by the server cache module, responsive to the received storage capacity information, a storage capacity profile for the mobile device, the storage capacity profile comprising at least one element from the set including (i) actual times that the mobile device is in a vehicle, (ii) amount of time that the mobile device is in the vehicle, (iii) available storage capacity of the mobile device with respect to (i) or (ii), (iv) the type of communication used to transfer data packets to the mobile device, and (v) the transfer time taken to transfer data packets from the mobile device to a vehicle; (c) parsing, by the server cache module, a software program into a first number of data packets based on the storage capacity profile, wherein the complete software program is contained in the first number of data packets; (d) storing, via communication with the mobile device cache module, in accordance with the storage capacity profile, at least some of the first number of data packets in the mobile device; and (e) receiving, from a vehicle cache module associated with a vehicle, a transfer status comprising a number (M) and identity of the data packets received from the mobile device.

Also provided is a mobile platform cache system, the system comprising: a wireless communication module for wireless communication with a mobile device cache module associated with a mobile device and a vehicle cache module associated with a vehicle; a processor; and a memory device; the processor coupled to the memory device and the wireless communication module and configured to, (a) build, responsive to communication from the mobile device cache module, a storage capacity profile in the memory device, the storage capacity profile for a mobile device comprising at least one element from the set including (i) actual times that the mobile device is in the vehicle, (ii) amount of time that the mobile device is in the vehicle, (iii) available storage capacity of the mobile device with respect to (i) or (ii), (iv) the type of communication used to transfer data packets to the mobile device, and (v) the transfer time taken to transfer data packets from the mobile device to a vehicle; (b) parse a software program into a first number of data packets based on the storage capacity profile, wherein the complete software program is contained in the first number of data packets; (c) command, via communication, in accordance with the storage capacity profile, the mobile device cache module to store at least some of the first number of data packets in the mobile device; (d) receive, from the vehicle cache module, a number (m) and identity of data packets received from the mobile device; and (e) repeat (a)-(d) until the vehicle has received a required number of data packets.

Another mobile platform cache method is provided, the method comprising: (a) building, by a server cache module, responsive to a Wi-Fi reception of storage capacity information associated with a mobile device, a storage capacity profile comprising at least one element from the set including (i) actual times that the mobile device is in a vehicle, (ii) amount of time that the mobile device is in the vehicle, and (iii) available storage capacity of the mobile device with respect to (i) or (ii); (b) encoding, by the server cache module, a software program; (c) parsing, by the server cache module, the encoded software program into a first number (N) of data packets; (d) transmitting data packets, in accordance with the storage capacity profile, to a mobile device cache module associated with the mobile device for storage in the mobile device; (e) receiving a transfer status indicating a number and identity of data packets received by a vehicle cache module; and (f) repeating (a)-(e) until the vehicle cache module has received a required number of data packets.

Other desired features will become apparent from the following detailed description and the appended claims, taken in conjunction with the accompanying drawings and this background.

DESCRIPTION OF THE DRAWINGS

A more complete understanding of the subject matter may be derived from the following detailed description taken in conjunction with the accompanying drawings, wherein, like reference numerals denote like elements, and.

DETAILED DESCRIPTION

Figure 1:
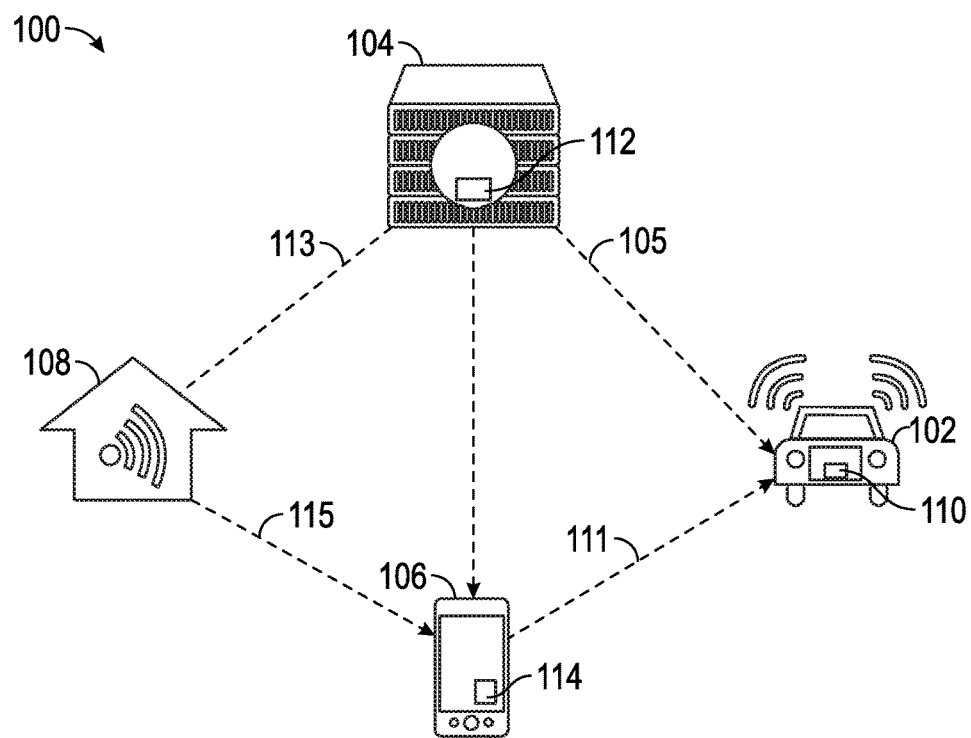
FIG. 1 is a simplified block diagram illustrating a mobile platform cache system, in accordance with various exemplary embodiments.

The following Detailed Description is merely exemplary in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over any other implementations. Furthermore, there is no intention to be bound by any expressed or implied theory presented in the preceding Technical Field, Background, Brief Summary or the following Detailed Description.

Techniques and technologies may be described herein in terms of functional and/or logical block components and with reference to symbolic representations of operations, processing tasks, and functions that may be performed by various computing components or devices. Such operations, tasks, and functions are sometimes referred to as being computer-executed, computerized, software-implemented, or computer-implemented.

In practice, one or more processor devices can carry out the described operations, tasks, and functions by manipulating electrical signals representing data bits at memory locations in the system memory, as well as other processing of signals. The memory locations where data bits are maintained are physical locations that have particular electrical, magnetic, optical, or organic properties corresponding to the data bits. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

The following descriptions may refer to elements or nodes or features being "coupled" together. As used herein, unless expressly stated otherwise, "coupled" means that one element/node/feature is directly or indirectly joined to (or directly or indirectly communicates with) another element/node/feature, and not necessarily mechanically. Thus, although the drawings may depict one exemplary arrangement of elements, additional intervening elements, devices, features, or components may be present in an embodiment of the depicted subject matter. In addition, certain terminology may also be used in the following description for the purpose of reference only, and thus are not intended to be limiting.

The subject matter presented herein relates to techniques for utilizing available storage capacity from one or more mobile devices as cache for a data transfer to a mobile platform. Although the below description implements the mobile platform as a vehicle, the techniques and technologies presented herein need not be limited to such an implementation. In this regard, other objects, systems, or devices that participate in a dynamic "traffic" environment can utilize the methodologies described herein. For example, a suitably configured and equipped bicycle, motorcycle, pedestrian-worn device, aircraft, watercraft, skateboard, or scooter can take the place of a vehicle in the exemplary embodiment described below. It is readily appreciated that mobile platform cache systems and methods may be designed to meet a plurality of application-specific standards beyond the scope of the examples presented below.

For the sake of brevity, conventional techniques related to transmitting and receiving signals, wireless communication modules, wireless transceivers, network interfaces, and other functional aspects of certain systems and subsystems (and the individual operating components thereof) may not be described in detail herein. In addition, certain terminology may also be used in the following description for the purpose of reference only. Accordingly, the examples presented herein are intended as non-limiting.

As a simplified overview, the provided mobile platform cache system and method employs three modules configured for wireless communication with each other. As used herein, the term module refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality. Generally, the three modules include a source module, a transfer module, and a destination module. An objective is to move a large piece of data (herein a "software program") from the source module to the destination module via one or more transfer modules associated with respective transfer devices. To achieve this, the source module determines, based on wireless communication with the transfer modules, how much of the software program it can store in onboard, preexisting storage locations, of one or more transfer devices, and parses the software program into data chunks accordingly. When desired wireless communication, such as Wi-Fi, is available, the source module transfers the data chunks into the storage locations in the transfer devices. When the transfer module has operable, and desired, wireless communication with the destination module, it transfers the data chunks to the destination module. The source module is configured to continually assess/determine the storage capacity of available transfer devices and parse/transmit/store data chunks until receiving wirelessly communicated information from the destination module that the entire software program has been received.

Referring now to the drawings, FIG. 1 is a simplified mobile platform cache system 100 diagram, in accordance with various exemplary embodiments. In the provided example, the destination is a mobile platform, the source module is in a server (i.e., a cloud), and the transfer module is in a mobile device. Although the following description realizes the mobile platform as a vehicle, the concepts presented here can be deployed in other mobile platforms, such as aircraft, spacecraft, watercraft, motorcycles, robot, robotic device, and the like. Moreover, the concepts presented here may also be deployed in non-mobile platform applications, if so desired.

As shown in FIG. 1, the exemplary mobile platform cache system 100 includes, in various embodiments, a vehicle cache module 110 associated with a vehicle 102; a mobile device cache module 114 associated with a mobile device 106; and, a server cache module 112 associated with a server 104. The vehicle 102, the mobile device 106, and the server 104 each comprise a user interface and a wireless communication module (described in connection with FIG. 2); each may be coupled to, or integrated with, the respective cache module. In an embodiment, the server cache module 112 may be associated with a telematics system, such as OnStar™, in communication with system components within the vehicle 102.

Communication between mobile cache modules is depicted as dotted lines. Where possible, the various embodiments of the mobile platform cache system 100 prioritize connections in a manner that minimizes connectivity costs. For example, the use of free Wi-Fi communication may be prioritized over cellular data communication (described in more detail with respect to FIG. 3), particularly between the mobile device 106 and the server 104. Existing routing stations 108 (such as Wi-Fi), located within a home, office, or other hotspot/access point may provide communication between the server 104 and the mobile device 106. The wireless communication modules support, without limitation, cellular data transfer and wireless communication (e.g., the wireless communication module may comprise a Wi-Fi access point, a dedicated short range communication DSRC onboard device, or other communication device). Additionally, the various wireless communication modules also support wired communication, and, at the various routing stations 108, the communication between a server 104 and a routing station 108 may be wired, such as DSL, whereas the communication between a mobile device 106 and routing station 108 may be wireless. In contrast, for communication between the vehicle 102 and the server 104, the mobile platform cache system 100 may prioritize the use of cellular data transmissions for any or all transmissions, and/or mobile platform cache system 100 may change the communication between the vehicle 102 the mobile device 106 and the server 104 back and forth between low cost wireless and cellular, as appropriate, for example, to meet software program transfer schedules.

The mobile device 106 may take the form of any portable electronic device or remote electronic device suitably configured to communicate via an onboard wireless communication module (FIG. 2 wireless communication module 216) with the server 104 and vehicle 102, and the routing station 108. Examples of mobile devices 106 include cellular phones, tablet computers, laptop computers, or other portable electronic devices.

Figure 2:
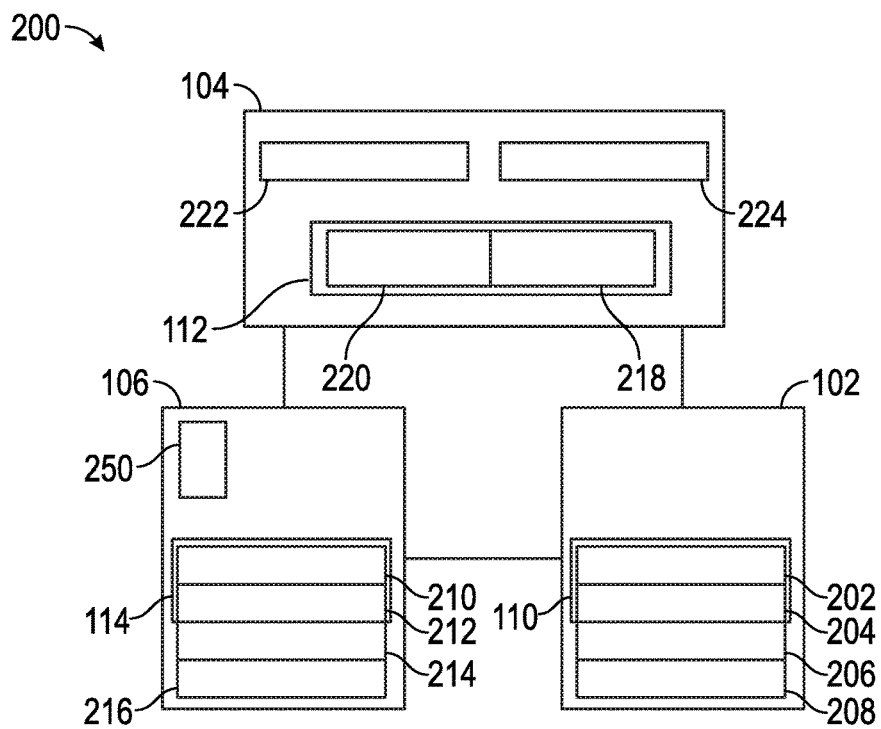
FIG. 2 is block diagram illustrating some of the system components of a mobile platform cache system, in accordance with various exemplary embodiments.

Referring next to FIG. 2, a block diagram illustrating some of the system components of a mobile platform cache system 200, in accordance with various embodiments, is provided. The functionality of the mobile platform cache system 200 may be implemented in any combination of software or firmware, and may employ program code segments or instructions that perform the various tasks. Moreover, each of the system components of the mobile platform cache system 200 may be configured to perform at least some of the mobile platform cache system 200 functionality described herein. Referring to the embodiment shown in FIG. 2, each of the mobile platform cache system 200 components comprises a respective "cache module" comprising a memory device, a processor, a wireless communication module, and a user interface, described in more detail below. As illustrated in FIG. 2, the vehicle 102 comprises a vehicle cache module 110 comprising a memory device 202, and a processor 204, in addition to a user interface 206 and a wireless communication module 208. The mobile device 106 comprises a mobile device cache module 114 comprising a memory device 210 and a processor 212, in addition to onboard memory 250, a user interface 214, and a wireless communication module 216; and, the server 104 comprises a server cache module 112 comprising a memory device 220, a processor 218, a user interface 224 and a wireless communication module 222. In various embodiments, the components of the mobile platform cache system 200 may also be operatively coupled to (not shown) an audio device, relevant vehicle subsystems, and vehicle hardware.

Within each cache module (110, 112, and 114), a memory device and a processor are coupled together such that the processor can read information from, and write information to, the memory device. The software or firmware program code segments or instructions that perform the various tasks described above can be stored in and among the memory devices 202, 210, and 222. In various embodiments of the mobile platform cache system 200, the processor and memory device of a respective cache module (i.e., the processor and memory device of 110, 112, and 114) are integrated within an already existing processor and memory device onboard the respective system component (such as, the vehicle 102, the mobile device 106, and the server 104).

As used herein, "memory device" 202, 210, and 222 comprise any combination of processor-readable or computer-readable storage mediums, which can be realized in a non-transitory and tangible form. The "processor-readable medium" or "machine-readable medium" may include any medium that can store or transfer information. Examples of the processor-readable medium include an electronic circuit, a semiconductor memory device, a RAM, a ROM, a flash memory, an erasable ROM (EROM), a floppy diskette, s removable disk, a CD-ROM, an optical disk, a hard disk, In various embodiments, the memory device may be integral to a respective processor. Memory devices may store non-transitory computer readable instructions and program code for operating the mobile platform cache system 200 as described herein. And various other functional or logical module/components of the components of the mobile platform cache system 200.

The above described software and firmware program code provides each cache module (110, 112, and 114) with communication protocols, input/output standards for wireless communication module connectivity, and validation procedures to verify associations between the vehicle 102, the mobile device 106, and the server 104. The validation procedures may be employed for security purposes, and communication between the vehicle 102, mobile device 106, and server 104 may be contingent upon satisfactory completion of validation procedures to verify and/or register associations between individual components. Accordingly, the included program code may include a commercial or propriety validation procedure employed to determine that there is a verified association between components prior to commencing the wireless exchange of further commands and data.

Although not the focus of the present invention, the validation procedure may require tasks such as a user registering, with the server 104, the user's ownership and control over identified mobile devices 106 and over the vehicle 102; uploading, into identified mobile devices 106, respective program code to support the mobile platform cache system 200; and, providing permission for said mobile devices 106 to participate in the mobile platform cache system and/or wirelessly communicate with vehicle 102. Within and among the participating components of the mobile platform cache system 200 (the vehicle 102, the mobile devices 106, and the server 104), respective memory devices and processors perform the described operations. A method for a mobile platform cache system is described in connection with FIG. 3.

The user interfaces 224, 214, and 206 may be realized as one or more of: a keypad, touchpad, keyboard, mouse, touchscreen, joystick, knob, microphone, speech recognition device, gesture interpretation device or another suitable device adapted to receive input from a user. A user may utilize a user interface to perform activities such as verify associations between components, enable participation in the mobile platform cache system 200, request software, and the like.

Server cache module 112 comprises, within memory device 220, the program code described above, and, in addition, may obtain a software program to transmit to the vehicle 102. As described herein, "software program" may comprise software or firmware updates, blocks of data, entertainment software, such as movies, and the like. Upon obtaining the software program, server cache module 112 stores the software program in memory device 220.

The server cache module 112 operations are performed by at least processor 218 and memory device 220. The server cache module 112 parses the software program into a first number (N) of data packets, the N data packets comprise the complete software program. The process for parsing the software program may also include utilizing a coding scheme to identify data packets; the parsing and encoding processes are described in more detail in connection with FIG. 3. The server cache module 112 is also configured to control wireless communication module 222. The server cache module 112 is also configured to store at least some of the first number of data packets in onboard memory of mobile device 106 by (1) commanding, in accordance with the storage capacity profile, the mobile device cache module 114 to store the at least some of the first number of data packets in onboard memory 250, and (2) transmitting said data packets to the mobile device cache module 114. Although storing comprises commanding and transmitting, commanding and transmitting may be separated by the passage of a variable amount of time. The variable amount of time may be user adjustable via user interface 224, and/or user interface 214. Advantageously, the mobile platform cache system 200 prioritizes communication according to cost, for example, the use of free Wi-Fi communication may be prioritized over costly cellular data communication to store data packets in mobile devices 106. Prioritizing the use of Wi-Fi communication may comprise averting or delaying, for a predetermined amount of time, the use of cellular data communication opportunities in order to await availability of Wi-Fi communication opportunities. In situations in which there is a time sensitivity to transmitting one or more data chunks to the vehicle 102, the mobile platform cache system 200 may determine that the server 104 shall communicate directly, using cellular data communication, with the vehicle cache module 110 (not utilizing mobile devices 106). In various embodiments, the mobile platform cache system 200 may employ a predetermined amount of time (for example a deadline) that is static, dynamic, fixed, or user adjustable, between attempts at low cost data transmission and resorting to cellular data transmission to complete the task of moving the large data content software program to the vehicle.

In embodiments having a plurality of mobile devices 106, the server cache module 112 is further configured to store, in accordance with the storage capacity profile, respective data packets in onboard memory 250 of respective mobile devices 106 by (1) commanding, in accordance with the storage capacity profile, a mobile device cache module 114 of a mobile device of the plurality of mobile devices 106 to store data packets, and (2) transmitting, in accordance with the storage capacity profile, the respective data packets.

The server cache module 112 may receive, via wireless communication module 222 (received from the wireless communication module 208 under the control of vehicle cache module 110), a transfer status comprising a number of data packets received (M) and identity of data packets received from the mobile device 106. While M is less than a "required number" of data packets (described in connection with FIG. 3), processor 218 and the program code stored in memory device 220 in the server cache module 112 may continually assess and utilize storage capacity provided by mobile devices 106 for transferring data packets. Accordingly, the server cache module 112 may receive updates of data capacity information from mobile device 106, and, responsive to updates: build or rebuild a storage capacity profile, parse the software program, and store data packets in the onboard memory 250 of one or more mobile devices, in a repeated process until the vehicle cache module 110 has received the required number of data packets, the notice of which may be communicated as part of a transfer status to server cache module 112, via wireless communication module 222. See FIGS. 3 316, 318, and 320 for reference. In response to received transfer status information and updates from the vehicle cache module 110, the server cache module 112 may build a delivery profile that comprises a percentage of N data packets delivered, the amount of time that the delivery has taken, and the number of times that each mobile device 106 of a plurality of mobile devices 106 is in the vehicle 102.

The wireless communication modules 208, 216, and 222 each comprise, without limitation, a transmitter and a receiver (or transceiver) for broadcasting and receiving wireless data packets through an antenna (not shown). Thus, data may be wirelessly communicated between the wireless communication module 208 associated with the vehicle 102, the wireless communication module 216 associated with the mobile device 106, and the wireless communication module 222 associated with the server 104. The communicated data can comprise commands, data packets, lightweight beacon packets, or the like. In certain embodiments, one or more of the wireless communication modules 208, 216, and 222 are implemented as a Wi-Fi access point that is compatible with the IEEE 802.11 standard. Other wireless technology included in the wireless communication modules may include: Dedicate Short Range Communication (DSRC); Bluetooth; Bluetooth low energy (BLE) that operate on unlicensed frequency bands; or other futuristic short- and medium-range communication technology such as cellular Device-to-Device (D2D) communication, and wearable communication devices. It should be appreciated that the wireless communication modules 208, 216, and 222 can support other wireless communication protocols or standards, as appropriate to the particular embodiment.

The mobile device cache module 114 operations are performed via at least processor 212 and memory device 210. The mobile device cache module 114 is configured to control wireless communication module 216. The mobile device cache module 114, when there is a verified association between the server 104 and a mobile device 106, transmits its storage capacity information to the server cache module 112 within the server 104, and the server cache module 112 receives the storage capacity information from mobile device cache module 114 within the mobile device 106. Further, the mobile device cache module 114 may transmit, to server cache module 112, updated mobile device 106 storage capacity information when opportunities arise. Transmitted updates may vary in frequency, having an aperiodicity that reflects when Wi-Fi communication is available between components with verified associations. For example an update may be transmitted when mobile device 106 is within range of Routing station 108. The flexible, aperiodic updates advantageously enable the system and method for a mobile platform cache to prioritize Wi-Fi communication over cellular data communication for the transmission of storage capacity information.

The mobile device cache module 114 also receives, from the server cache module 112, commands and data packets for storage in onboard memory 250. Responsive thereto, mobile device cache module 114 stores the data packets in onboard memory 250. When the mobile device 106 is in the vehicle 102, and upon verified association with the vehicle 102, the mobile device cache module 114 transmits the stored data packets to the vehicle cache module 110. In some embodiments, the mobile device cache module 114 further transmits a request for a software program to the server cache module 112, and/or receives a command from the server cache module 112 to delete a data packet from its storage location in mobile device 106 (said command being sent by the server cache module 112 after it receives, from the vehicle cache module 110, an indication that the respective data packet was received by the vehicle cache module 110).

The vehicle cache module 110 operations are performed via at least processor 204 and memory device 202. The vehicle cache module 110 is configured to control wireless communication module 208. The vehicle cache module 110 receives data packets and stores them in memory device 202, or other onboard memory within the vehicle 102. The vehicle cache module 110 may receive, from server cache module 112, a first number (N) and/or any coding scheme information associated with the transmission of the software program. The processor 204 and memory device 202 within vehicle cache module 110 processes the data packets, removes any added codes or keys, keeps track of the identity of individual data packets received, the number (M) of all of the data packets received, and reports this information, as a transfer status, to the server cache module 112. When the vehicle cache module 110 has received a "required number" of the data packets, the vehicle may compile the software program.

In some embodiments, the required number of data packets for the vehicle cache module 110 to receive is M=N data packets. In other embodiments described in connection with the flow chart of FIG. 3, a coding scheme allows for the software program to be compiled within the vehicle 102 after receiving N data packets. In the embodiments, upon determining that the required number of data packets has been received, the vehicle cache module 110 performs any decoding still required to remove keys from data packets, and compiles the software program. The vehicle cache module 110 stores the software program in memory device 202, and reports to the server cache module 112 when the software program has been compiled. In some embodiments, the vehicle cache module 110 requests software programs from server 104.

In embodiments having a plurality of mobile devices 106, each mobile device of the plurality of mobile devices 106 must have a verified association with the server cache module 112 prior to contributing storage capacity to the mobile platform cache system 200. With a verified association, each mobile device cache module 114 of the plurality of mobile devices 106 may be configured to update server cache module 112 with transmissions of its respective storage capacity information. As mentioned above, updates may occur aperiodically, for example, when a mobile device 106 has a Routing station 108 or other opportunity for Wi-Fi communication with the server 104. In embodiments having a plurality of mobile devices 106, the server cache module 112 builds a storage capacity profile comprising at least one element from the set including (i) actual times that the mobile device 106 is in the vehicle, (ii) amount of time that the mobile device 106 is in the vehicle, and (iii) available storage capacity of the mobile device 106 with respect to (i) or (ii), for each mobile device of the plurality of mobile devices 106. In some embodiments, based on transfer status information from a vehicle cache module 110, the server cache module 112 includes within the storage capacity profile, the type of communication used to transfer data packets to a respective mobile device 106, and the transfer time taken to transfer data packets from a respective mobile device 106 to a vehicle 102.

Figure 3:
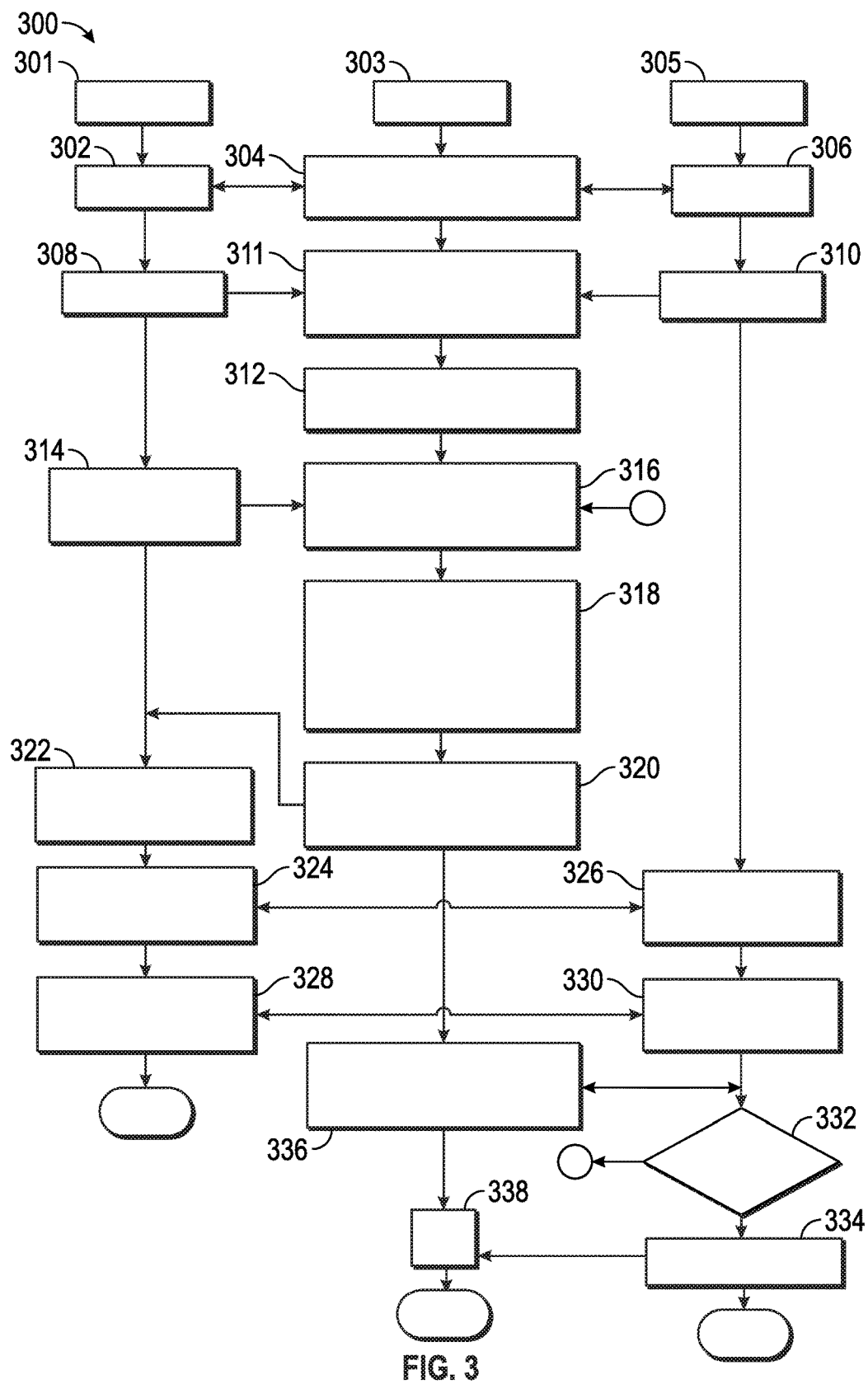
FIG. 3 is a flow chart describing a method for a mobile platform cache system, in accordance with various exemplary embodiments.

FIG. 3 is a flow chart describing one implementation of a method for a mobile platform cache 300. For illustrative purposes, the following description may refer to components and modules mentioned above in connection with FIGS. 1 and 2. Accordingly, a method for a mobile platform cache 300 comprises (1) a method for a mobile device cache module 301, (2) a method for a server cache module 303, and (3) a method for a vehicle cache module 305, each of which are shown and described herein below. It should be appreciated that the method for a mobile platform cache 300 may include any number of additional or alternative operations or tasks, the operations shown in FIG. 3 need not be performed in the illustrated order, and the method for a mobile platform cache 300 may be incorporated into a more comprehensive procedure or process having additional functionality not described in detail herein. Moreover, one or more of the operations or tasks shown in FIG. 3 could be omitted from an embodiment of a method for a mobile platform cache 300 as long as the intended overall functionality remains intact.

As previously mentioned, server cache module 112 operations are performed via at least processor 218, memory device 220, and wireless communication module 222. The operations of a method for a server cache module 112 are as follows. At 304, server cache module 112 may verify an association with mobile device 106 and/or vehicle 102 by performing a validation procedure (as described above). At 312 a software program to be transferred to a vehicle 102 determined to have a verified association with the server 104 is obtained. While not a focus of the present invention, the software program may be obtained via the user interface 224, or any data upload procedure. Obtaining a software program may be responsive to a request (at 311) from the vehicle 102, a request for it from the mobile device 106, or an internal request from server 104.

At 316, server cache module 112 receives storage capacity information from the mobile device cache module 114 located within mobile device 106. As mentioned, the mobile platform cache system 200 prioritizes communication to reduce cost, which may result in the use of free Wi-Fi communication over cellular data communication where possible. In particular, Wi-Fi communication, via a routing station 108 may be used for receiving storage capacity information from the mobile device 106, as described above. Storage capacity information comprises, for a mobile device 106, at least one element from the set including (i) actual times that the mobile device 106 is in the vehicle 102, (ii) amount of time that the mobile device 106 is in the vehicle 102, and (iii) wireless communication capability of the mobile device 106 with respect to (i) or (ii). Storage capacity information may also comprise one or more locations of available memory within mobile device 106. For example, the server cache module 112 may receive storage capacity information that a first mobile device 106 is (1) in vehicle 102 at 8:00 AM Monday through Friday, (2) for twenty minutes each time, (3) using very little of available memory device 210, (4) is in the vehicle 102 on Saturday at 10 AM, (5) for three hours, (6) during which time, most of the onboard memory 250 is in use.

Server cache module 112 processes the wirelessly received storage capacity information and builds a storage capacity profile therefrom (316). The storage capacity profile enables the process for a mobile platform cache 300 to utilize onboard memory 250 in mobile device 106 while minimizing interference with the user's normal operation of the mobile device 106. In an embodiment the system may prevent the mobile device 106 from transferring the data packets to the vehicle 102 if the mobile device 106 is occupied with other activities (such as playing a movie) and/or the wireless communication capacity does not allow the data packets to be transmitted to the vehicle 102 in a manner that prevents user experience degradation. In order to minimize interference with the user's normal operation of a mobile device 106, the mobile platform cache system 200 determines to utilize less than the total amount of unused onboard memory 250 (for example, a mobile device 106 with 16 Giga Bytes (GB) free may be determined to provide about 1 GB, whereas a mobile device 106 with 500 Mega Bytes (MB) free may be determined to provide about 20 MB). In the above example, the storage capacity profile indicates opportunities to store larger quantities of data in mobile device 106 prior to 8:00 AM Monday through Friday, but only twenty minutes to download that stored data into the vehicle each time, and an opportunity to store less data prior to 10 AM on Saturday, because although the user may have the mobile device 106 inside the vehicle 102 for three hours at 10 AM on Saturday, onboard memory 250 cannot be used because it would interfere with the user's normal operation of the mobile device 106.

In accordance with the storage capacity information received at 311, the storage capacity profile built in 318 comprises, for the mobile device 106, at least one element from the set including (i) actual times that the mobile device 106 is in the vehicle 102, (ii) amount of time that the mobile device 106 is in the vehicle 102, and (iii) available storage capacity of the mobile device 106 with respect to (i) or (ii). In some embodiments, based on transfer status information from a vehicle cache module 110, the server cache module 112 includes within the storage capacity profile, the type of communication used to transfer data packets to a respective mobile device 106, and the transfer time taken to transfer data packets from a respective mobile device 106 to a vehicle 102.

At 318, the server cache module 112 parses the software program into a first number (N) of data packets, the size and number (N) of the data packets may be based on (i) the storage capacity profile, and (ii) a coding scheme. The data packets are used for transfer from the server cache module 112 to the mobile device cache module 114, and, at a later time, from the mobile device cache module 114 to the vehicle cache module 110. The availability of low cost or Wi-Fi communication between the server 104 and mobile device 106, and between the mobile device 106 and vehicle 102 may dictate the timing of the transfer of data packets. In various embodiments, the complete software program is contained in the N data packets.

As mentioned, parsing (at 318), may comprise employing a coding scheme with the data packets; such coding schemes may add symbolic information to the total number of symbols that comprise the software program, thereby increasing the total number of data packets (N) generated (holding data packet size constant). However, regardless of the value of N, N represents the number of data packets generated to include the entire software program. In a first non-limiting code scheme example, server cache module 112 adds a unique key to each data packet prior to 320 (storing data packets), wherein the added key encodes, for a respective data packet, a length of the data packet and a position of the data packet within the software program. In another non-limiting code scheme example, server cache module 112 adds a unique key to each data packet, wherein the added key encodes, for a respective data packet, an identity of a mobile device 106 that the data packet is to be transferred to (and stored within). In a third non-limiting code scheme example, server cache module 112 encodes the software program into data chunks using any commercially available fountain code (also referred to as rateless erasure code), thereby generating data packets with a methodology that enables the vehicle cache module 110 to extrapolate the entire software program after receiving K<N packets. In the third code scheme example, when the vehicle detects it has M=K messages it is able to extrapolate and compile the entire software program.

When coding schemes are employed, the server cache module 112 communicates this information to the vehicle cache module 110, which employs the respective decoding process to remove the keys or codes from the symbolic information comprising the software program prior to compiling the software program. The vehicle cache module 110 uses information obtained from the decode process in the generation of a transfer status. Referring to the third code scheme example, after receiving K data packets, the vehicle cache module 110 compiles the software program and updates the server with a successful compile. During reception of data packets, the transfer status generated by the vehicle cache module 110 comprises reporting M, as before, and the server cache module 112 continues to transmit and store data packets until receiving notice that the software program has been compiled in the vehicle 102, which generally aligns with M=K.

At 320, the server cache module 112 stores at least some of the first number of data packets in onboard memory 250 within the mobile device 106, by (1) commanding mobile device cache module 114 to store the data packets and (2) transmitting the data packets, in accordance with the storage capacity profile. As above, the method for the mobile platform cache system 200 prioritizes low cost, or free, communication over cellular data communication for storing data packets in mobile devices 106. In an embodiment, the mobile platform cache method further comprises, receiving, by server cache module 112, an indication from the mobile device cache module 114 that the mobile device 106 is being charged; and at 320 (storing) further comprises storing only upon the condition that the mobile device 106 is being charged.

Over the course of time, 316 may be repeated; therefore, server cache module 112 may aperiodically receive, from the mobile device cache module 114, an update regarding the storage capacity of mobile device 106. When an update is received, server cache module 112 may repeat 316, 318, and 320, until receiving a transfer status indicating that the required number of data packets has been received at the vehicle 102.

As previously mentioned, aperiodic updates may reflect occasions that Wi-Fi communication between the mobile device 106 and the server 104 is available. As before, the received update may include, for mobile device 106, at least one element from the set including (i) actual times that the mobile device 106 is in the vehicle 102, (ii) amount of time that the mobile device 106 is in the vehicle 102, and (iii) available storage capacity of the mobile device 106 with respect to (i) or (ii). Continuing with the above example, over time, updates from the mobile device cache module 114 may indicate that the user continues to generally be in the vehicle 102 at the same times and durations Monday through Friday, but the weekend times and durations vary. In response to the received updates, the server cache module 112 may repeat 316, thereby re-building the storage capacity profile.

Accordingly, with repeated updates over the course of time, the server cache module 112 optimizes the storage capacity profile into a more and more accurate picture of the temporal variability of the available storage capacity from mobile device 106. As the storage capacity profile is optimized, it increases an assurance that the size and amount of data packets stored in the mobile device 106 is reflective of an amount of available transfer time the mobile device 106 is predicted to have within the vehicle 102, while minimizing interference with a user's normal operation of the mobile device 106.

At 336, server cache module 112 may transmit to the vehicle cache module 110 the first number N, a second number K, and/or any associated coding scheme information to prepare the vehicle cache module 110 for incoming data packets. At 336, the server cache module 112 receives notice, from vehicle cache module 110, of the transfer status, which may comprise a number of received data packets (M), and the identity of the received data packets M. The server cache module 112 may repeat building (at 316), parsing (at 318), storing (at 320), and receiving (at 336) until receiving notice that the vehicle cache module 110 has received a required number of data packets and/or until receiving notice that the vehicle cache module 110 has compiled the software program. For example, the required number of data packets is N; in which case, in response to receiving a transfer status that M is less than N, the server cache module 112 may repeat building (at 316), parsing (at 318), storing (at 320), and receiving (at 336) until M=N. In another example, the required number of data packets is K<N; in which case, in response to receiving a transfer status that M is less than K, the server cache module 112 may repeat building (at 316), parsing (at 318), storing (at 320), and receiving (at 336) until receiving notice that M=K, or until receiving notice that the software program has been compiled (at 338). Additionally, the server cache module 112 may command mobile device cache module 114 to delete a data package from its storage location in response to the transfer status indicating that the data packet has been received by the vehicle cache module 110.

In embodiments having a plurality of mobile devices 106, each mobile device of the plurality of mobile devices 106 may be required to have a verified association with the server 104 and the vehicle 102 prior to reporting storage capacity information to server cache module 112 (314). Further, each mobile device cache module 114 of the plurality of mobile devices 106 may, aperiodically, transmit storage capacity information and/or storage capacity updates to server cache module 112 (314). Responsive to an update from a mobile device cache module 114, the server cache module 112 builds or rebuilds a storage capacity profile (at 316) comprising the update, wherein the update may comprise, for a respective mobile device 106, at least one element from the set including (i) actual times that the mobile device 106 is in the vehicle, (ii) amount of time that the mobile device 106 is in the vehicle, and (iii) available storage capacity of the mobile device 106 with respect to (i) or (ii). In some embodiments, server cache module 112 receives updates from one or more of a plurality of available mobile devices 106, and stores the updates temporarily, for a user adjustable predetermined time; after the predetermined time elapses, the server cache module 112 rebuilds the storage capacity profile responsive to all updates received from the plurality of available mobile devices 106 during the predetermined time.

When the storage capacity profile has been built to comprise storage capacity information for a plurality of mobile devices 106, task 320 storing, in accordance with the storage capacity profile, at least some of the first number of data packets in the mobile device further comprises: storing, in accordance with the storage capacity profile, at least some of the first number of data packets in more than one mobile device 106 of the plurality of mobile devices 106. As described above, the method for mobile platform cache 300 stores data packets according to the storage capacity profile, which assures that the size and amount of data packets stored in the onboard memory 250 of each mobile device 106 of the plurality of mobile devices 106 reflects not only onboard memory capacity deemed available, but also an amount of available transfer time, during which a respective mobile device 106 is predicted to be within the vehicle 102.

Continuing with the above example, the storage capacity profile may indicate that 60 data packets may be stored in a first mobile device, 5 data packets may be stored in a second mobile device, and 100 data packets may be stored in a third mobile device. The server cache module 112 may be further configured to, upon receiving an indication that a specific data packet was received by the vehicle 102, command the mobile device 106 having stored that specific data packet to delete it from its respective storage location. In another embodiment, the mobile device cache module 114 automatically deletes a data packet from storage 150 after it is transferred to the vehicle 102.

As previously mentioned, mobile device cache module 114 operations are performed via at least processor 212, memory 210, and wireless communication module 216. The following description addresses a method for a mobile device cache module 301 and a method for a vehicle cache module 305. The method for a mobile device cache module 301 comprises, at 302, the aforementioned validation procedure to ensure a verified association between the mobile device 106 and the server 104. At 308 the mobile device cache module 114 optionally transmits a request for a software program to the server cache module 112. At 314, the mobile device cache module 114 transmits storage capacity and usage information associated with onboard memory 250 to the server cache module 112. A described, 314 may be aperiodic, recurring with a frequency that reflects the availability of Wi-Fi communication. At 322, the mobile device cache module 114 receives and stores data packets from the server cache module 112 in onboard memory 250. Upon a verified association between the mobile device 106 and the vehicle 102 (324), the mobile device cache module 114 transmits data packets to vehicle cache module 110 (328).

As previously mentioned, vehicle cache module 110 operations are performed via at least processor 204, memory device 202, and wireless communication module 208. The method for a vehicle cache module 305 comprises, at 306, the aforementioned validation procedure to ensure a verified association between the vehicle 102 and the server 104. At 310, the vehicle cache module 110 optionally transmits a request for a software program to the server cache module 112. At 326, the vehicle cache module 110 validates that it has a verified association with the mobile device 106. The vehicle cache module 110 receives data packets from the mobile device cache module 114 (at 328). Vehicle cache module 110 identifies received data packets, identifies the number of received data packets (M), determines when it has received all required data packets (in various embodiments, either N data packets, or K≠N data packets), and transmits this information, as a transfer status, to the server cache module 112 (at 332). The transfer status information from the vehicle cache module 110 may also include the type of communication used to transfer data packets to a respective mobile device 106, and the transfer time taken to transfer data packets from a respective mobile device 106 to a vehicle 102. The vehicle cache module 110 may additionally transmit an update to the server cache module 112 indicating when it has finished compiling the software program (at 334).

Thus, a system and method that enables large content data transfers to mobile platforms while utilizing low cost communications is provided. The system and method provided build a cache suitable for large content data transfers using the available storage capacity of one or more frequently used, existing mobile devices, thereby reducing cache cost. The provided mobile cache system and method utilize low cost or free communications with one or more mobile devices, thus not exclusively depending on cellular data transmissions.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A mobile platform cache method, the method comprising:
   at a server cache module,
   (a) receiving
      via communication from a mobile device cache module that is associated with the mobile platform, storage capacity information associated with a mobile device, the storage capacity information including an amount of time and an amount of available memory while the mobile device is in the mobile platform;
   (b) building a storage capacity profile for the mobile device that is responsive to the received storage capacity information;
   (c) optimizing the storage capacity profile for the mobile device to thereby reflect a predicted amount of available transfer time and a predicted amount of available memory while the mobile device is in the mobile platform, wherein optimizing includes rebuilding the storage capacity profile for the mobile device responsive to received updates to the storage capacity information associated with the mobile device;
   (d) parsing a software program into a first number, N, of data packets based on the optimized storage capacity profile, wherein the complete software program is contained in the N data packets;
   (e) determining whether Wi-Fi is available for transmission of data packets;
   (f) transmitting the data packets to the mobile device, wherein transmitting is in accordance with the storage capacity profile, and is cost-prioritized as follows, (i) when Wi-Fi is available, transmit data packets via Wi-Fi, (ii) when Wi-Fi is not available, (a) delay Wi-Fi transmission of non-time sensitive data packets for a predetermined amount of time, and (b) transmit time sensitive data packets via cellular communications;
   (g) commanding the mobile device to store received data packets wherein commanding is in accordance with the storage capacity profile; and
   (h) receiving, from a vehicle cache module associated with the mobile platform, a transfer status comprising a number (M) and identity of the M data packets received from the mobile device.

2. The mobile platform cache method of claim 1, wherein parsing, by the server cache module, comprises encoding, by the server cache module, each data packet.

3. The mobile platform cache method of claim 2, further comprising:
   repeating (c) through (h) until receiving notice that M=N, or the software program has been compiled in the mobile platform.

4. The mobile platform cache method of claim 1, wherein the mobile device is one of a plurality of mobile devices associated with the mobile platform, each mobile device having a respective mobile device cache module, and further comprising;
   at the server cache module,
      for each mobile device of the plurality of mobile devices, receiving, via communication from a respective mobile device cache module, storage capacity information associated with the mobile device, the storage capacity information including an amount of available transfer time and an amount of available memory while the mobile device is in the mobile platform;
   building the storage capacity profile to include received storage capacity information from each mobile device of the plurality of mobile devices, and
   optimizing the storage capacity profile to thereby reflect, for each mobile device of the plurality of mobile devices, a predicted amount of available transfer time and a predicted amount of available memory while the mobile device is in the mobile platform responsive to received updates to the storage capacity information of each mobile device of the plurality of mobile devices.

5. The mobile platform cache method of claim 1, wherein the storage capacity profile further comprises a storage location in the mobile device, and further comprising deleting a data packet from the storage location subsequent to it being received by the vehicle cache module.

6. The mobile platform cache method of claim 4, wherein (g) commanding the mobile device to store received data packets further comprises commanding each of the plurality of mobile devices to store, in accordance with the storage capacity profile, at least some of the first number N of data packets.

7. The mobile platform cache method of claim 6, wherein the storage capacity profile further comprises, for each mobile device of the plurality of mobile devices, a respective storage location, and further comprising:
deleting, by the server cache module, a data packet from a storage location in a respective mobile device based on the transfer status.

8. The mobile platform cache method of claim 3, further comprising:
receiving, via wireless communication from the mobile device cache module, an indication that the mobile device is being charged; and
wherein (g) commanding the mobile device to store received data packets further comprises storing only upon the condition that the mobile device is being charged.

9. The mobile platform cache method of claim 1, wherein obtaining a software program is responsive to a request received from the vehicle cache module or the mobile device cache module.

10. A mobile platform cache system, the system comprising:
a wireless communication module for wireless communication with a mobile device cache module associated with a mobile device and a vehicle cache module associated with a vehicle;
a processor; and
a memory device;
the processor coupled to the memory device and the wireless communication module and configured to,
(a) build, responsive to wireless communication from the mobile device cache module, a storage capacity profile in the memory device, the storage capacity profile comprising storage capacity information for the mobile device including, an amount of time and an amount of available memory while the mobile device is in the vehicle, a type of wireless communication used to transfer data packets to the mobile device, and a transfer time taken to transfer data packets from the mobile device to a vehicle;
(b) optimize the storage capacity profile for the mobile device to thereby reflect a predicted amount of available transfer time and a predicted amount of available memory while the mobile device is in the mobile platform, by rebuilding the storage capacity profile for the mobile device responsive to received updates to the storage capacity information of the mobile device;
(c) parse a software program into a first number N of data packets based on the storage capacity profile, wherein the complete software program is contained in the first number of data packets;
(d) determine whether Wi-Fi is available for transmission of data packets;
(e) transmit the data packets to the mobile device, wherein transmitting is in accordance with the storage capacity profile, and is cost-prioritized as follows, (i) when Wi-Fi is available, transmit data packets via Wi-Fi, (ii) when Wi-Fi is not available, (a) delay Wi-Fi transmission of non-time sensitive data packets for a predetermined amount of time, and (b) transmit time sensitive data packets via cellular communications;
(f) command, in accordance with the storage capacity profile, the mobile device to store received data packets;
(g) receive, from the vehicle cache module, a number (M) of data packets, and an identity of the M data packets received from the mobile device; and
(h) repeat (b) through (g) until receiving notice that the vehicle has received a required number of data packets.

11. The mobile platform cache system of claim 10, wherein the processor is further configured to, during parsing, encode each data packet.

12. The mobile platform cache system of claim 11, wherein the processor is further configured to
(h) repeat (c) through (h) until receiving notice that M=N, or the software program has been compiled in the vehicle.

13. The mobile platform cache system of claim 12, wherein the mobile device is one of a plurality of mobile devices onboard the vehicle, and the processor is further configured to:
build the storage capacity profile in the memory device responsive to wireless communication from each respective mobile device cache module that storage capacity information for the mobile device, the storage capacity information including, an amount of available transfer time and an amount of available memory while the mobile device is in the vehicle, a type of wireless communication used to transfer data packets to the mobile device, and a transfer time taken to transfer data packets from the mobile device to a vehicle; and
optimize the storage capacity profile to thereby reflect, for each mobile device of the plurality of mobile devices, a predicted amount of available transfer time and a predicted amount of available memory while the mobile device is in the mobile platform responsive to received updates to the storage capacity information of each mobile device of the plurality of mobile devices.

14. The mobile platform cache system of claim 13, wherein the processor is further configured to store data packets in the plurality of mobile devices, in accordance with the storage capacity profile.

* * * * *